(12) United States Patent
Isshiki et al.

(10) Patent No.: US 6,605,014 B2
(45) Date of Patent: Aug. 12, 2003

(54) TOOTHED BELT

(75) Inventors: Shigehiro Isshiki, Nara (JP); Tsutomu Tokunaga, Nara (JP); Yoshitaka Sato, Nara (JP)

(73) Assignee: Unitta Company, Osaka (JP)

( * ) Notice: Subject to any disclaimer, the term of this patent is extended or adjusted under 35 U.S.C. 154(b) by 0 days.

(21) Appl. No.: 09/853,597

(22) Filed: May 14, 2001

(65) Prior Publication Data

US 2001/0051555 A1 Dec. 13, 2001

(51) Int. Cl.[7] .............................. F16G 1/04; F16G 5/20; B32B 5/02
(52) U.S. Cl. ................ 474/263; 474/260; 474/205; 428/172
(58) Field of Search ................ 428/171, 172, 428/167, 168, 295.4; 474/260, 263, 264, 237, 271, 261, 238, 205

(56) References Cited

U.S. PATENT DOCUMENTS

| | | | | |
|---|---|---|---|---|
| 3,916,447 A | * | 11/1975 | Thompson | 428/481 |
| 4,041,203 A | * | 8/1977 | Brock et al. | 428/340 |
| 4,096,313 A | * | 6/1978 | Fujita et al. | 428/516 |
| 4,146,663 A | * | 3/1979 | Ikeda et al. | 428/903 |
| 4,429,001 A | * | 1/1984 | Kolpin et al. | 428/323 |
| 4,533,420 A | * | 8/1985 | Wetzel | 156/138 |
| 4,583,963 A | * | 4/1986 | Marsh et al. | 474/205 |
| 4,617,075 A | * | 10/1986 | Wetzel et al. | 156/137 |
| 4,626,232 A | * | 12/1986 | Witt | 156/138 |
| 4,895,555 A | * | 1/1990 | Watanabe et al. | 474/260 |
| 4,923,454 A | * | 5/1990 | Seymour et al. | 604/368 |
| 5,492,507 A | * | 2/1996 | Kumazaki | 474/205 |
| 5,711,734 A | * | 1/1998 | Shioyama et al. | 474/260 |
| 6,007,897 A | | 12/1999 | Tamaki et al. | |
| 6,117,035 A | | 9/2000 | Isshiki et al. | |
| 6,406,397 B1 | | 6/2002 | Isshiki et al. | |

FOREIGN PATENT DOCUMENTS

| | | |
|---|---|---|
| JP | 06-286040 A1 * | 10/1994 |
| JP | 07-98044 A1 * | 4/1995 |
| JP | 9-118789 | 5/1997 |
| JP | 10-89418 | 4/1998 |

* cited by examiner

Primary Examiner—Marcus Charles
(74) Attorney, Agent, or Firm—Greenblum & Bernstein, P.L.C.

(57) ABSTRACT

Toothed belt comprises teeth and bottoms which are alternately formed at one surface of the toothed rubber layer of the toothed belt. A fabric is provided at the outer surface of the teeth and the bottoms. A back rubber layer is integrally provided at the other surface of the toothed rubber layer. A plurality of cords are interposed at the interface between the toothed rubber layer and the back rubber layer. A large number of modified microfibers are intermixed throughout the toothed rubber layer. The modified microfibers consist of a copolymer of polyolefin and nylon fiber. The modified microfibers are oriented in the length direction of the toothed belt as a whole.

19 Claims, 9 Drawing Sheets

TOOTHED BELT

BACKGROUND OF THE INVENTION

1. Field of the Invention

The present invention relates to a toothed belt used as a timing belt or a synchronous belt, and more particularly relates to a toothed belt used as a power transmission belt for transmitting the rotational drive force of an engine of an automobile or other vehicle from a crankshaft to a cam shaft, balancer shaft, drive shaft of a fuel injection pump, etc.

2. Description of the Related Art

A conventional toothed belt is provided with a toothed rubber layer. Teeth and bottoms are alternately formed on one surface of the toothed rubber layer. A back rubber layer is integrally provided at the other surface of the toothed rubber layer. Cords are embedded at the interface between the toothed rubber layer and the back rubber layer. In recent years, along with the improvement of the performance of engines of automobiles and other vehicles, the speed of crank shafts has risen and a much greater load has been placed on the toothed belts used for driving the cam shaft, injection pump shaft, and other auxiliary equipment shafts. Therefore, breakage of teeth has become faster.

As a means to prevent such premature tooth breakage accompanying increases in load, as described in Japanese Unexamined Patent Publication No. 10-89418, it has been considered to strengthen the rigidity of the toothed rubber layer by mixing into the toothed rubber layer aramid staple fibers oriented in one direction. The bondability with the rubber ingredient of the toothed rubber layer when intermixing aramid staple fibers, however, is not sufficient. If the toothed belt is used under high load conditions over a long period, the problem arises of breakage of the teeth due to cracks from the interfaces between the aramid staple fibers and the rubber ingredient.

SUMMARY OF THE INVENTION

Therefore, an object of the present invention is to provide a toothed belt configured to solve the problem of the premature breakage of teeth.

The toothed belt of the present invention is provided with a toothed rubber layer. The toothed rubber layer has teeth and bottoms alternately formed on one surface. A back rubber layer is integrally joined to the other surface of the toothed rubber layer. A plurality of cords are interposed at the interface between the toothed rubber layer and the back rubber layer. These cords extend along the length direction of the toothed belt and are arrayed along the width direction. According to the present invention, a large number of modified nylon microfibers are mixed and regularly oriented in the toothed rubber layer in the toothed belt as a whole and the modified nylon microfibers are fine denier nylon fibers obtained by graft polymerization with a polyolefin.

In the present invention, a fiber length $L_F$ of the modified nylon microfiber may be not more than about 4000 $\mu$m, preferably not more than about 1000 $\mu$m. Further, the fiber diameter $D_F$ of the modified nylon microfiber may be not more than about 1.5 $\mu$m, preferably not more than about 1.0 $\mu$m. Further, the value of the ratio of the fiber length $L_F$ to the fiber diameter $D_F$ ($L_F/D_F$) may be not less than 10, preferably in the range of 500 to 1500.

In the present invention, the nylon fibers are preferably made of Nylon 6 and the polyolefin is preferably made from polyethylene.

In the present invention, it is possible to intermix about 10 to about 40 parts by weight of modified nylon microfibers in 100 parts by weight of the rubber stock of the toothed rubber layer. Preferably, about 25 parts by weight of modified nylon microfibers are intermixed.

In the present invention, the stock rubber used for the toothed rubber layer and the back rubber layer may be a hydrogenated nitrile rubber with a hydrogenation rate of at least 91% and a peroxide-based vulcanizing agent may be added to the stock rubber.

Preferably, the modified nylon microfibers are oriented in the length direction of the toothed belt. In this case, the modified nylon microfibers are oriented along contours at regions near alternating contours of the teeth and the bottoms of the toothed belt layer and are oriented substantially perpendicular to the surface of the back rubber layer at the center regions of the teeth of the toothed rubber layer. On the other hand, the modified nylon microfibers may be oriented in the width direction of the toothed belt.

In the present invention, preferably, fabric is provided to cover the teeth and the bottoms of the toothed rubber belt. The fabric is comprised of an elastic composite yarn extending along the longitudinal direction of the toothed belt and a non-elastic yarn extending along the width direction of the toothed belt. The elongation of the fabric when elongated to breakage is made about 30 to about 80% of the original length. Further, the fabric may be treated by a resorcinol formaldehyde latex solution. Alternatively, the fabric may be preformed.

In the present invention, the cords may be formed from high strength glass fibers and the cords may be arrayed at intervals of about 0.17 to about 0.28 mm. Further, the cords may be formed from aramid fibers and the cords may be arrayed at intervals of about 0.25 to about 0.36 mm. Preferably, the cords are treated by a resorcinol formaldehyde latex solution, an overcoat layer of a rubber paste solution is formed on the cords, and preferably a cashew-modified phenol resin layer is formed on the overcoat layer.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention will be described below with reference to the embodiments shown in the drawings.

Figure 1:
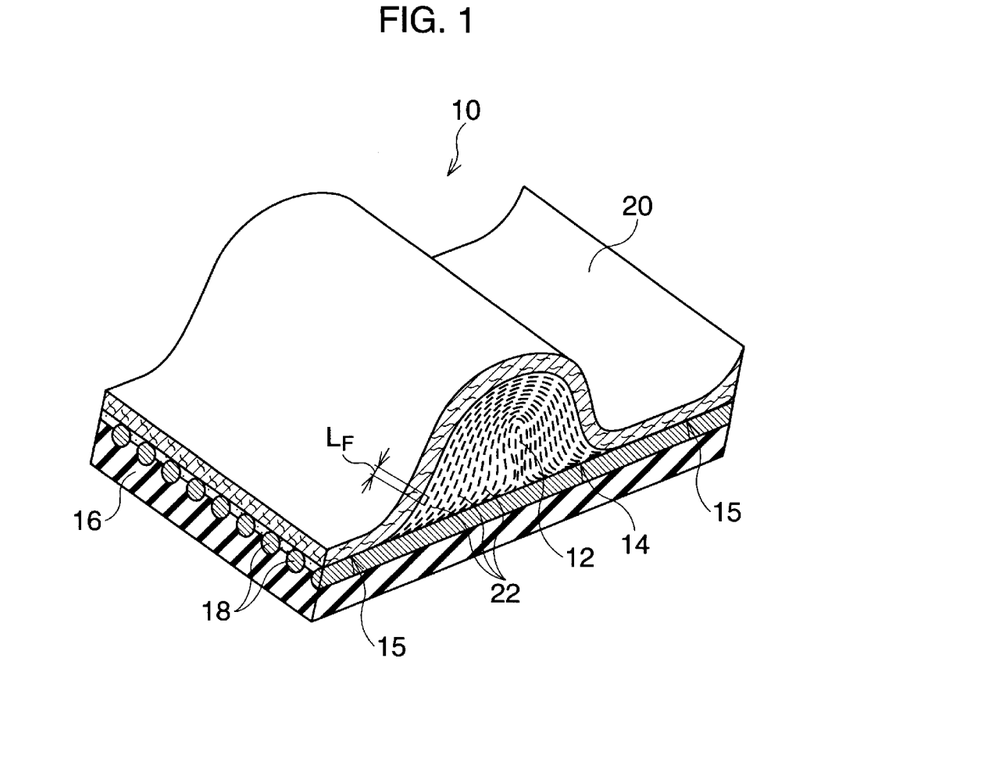
FIG. 1 is a partial perspective view of a first embodiment of a toothed belt according to the present invention.

FIG. 1 shows a first embodiment of the toothed belt according to the present invention by reference numeral 10. The figure shows a perspective view of a part cut from the toothed belt 10.

The toothed belt 10 is provided with a toothed rubber layer 12. The teeth 14 and the bottoms 15 are alternately integrally formed on one surface of the toothed rubber layer 12. A back rubber layer 16 is integrally provided on the other surface of the toothed rubber layer 12. The toothed belt 10 is further provided with a fabric 20. The fabric 20 is closely bonded to the surfaces of the teeth 14 and bottoms 15 of the toothed rubber layer 12. A plurality of cords 18 are embedded at the interface between the toothed rubber layer 12 and the back rubber layer 16.

As shown in FIG. 1, a plurality of modified nylon microfibers 22 are intermixed substantially uniformly throughout the toothed rubber layer 12. Further, the modified nylon microfibers 22 are distributed regularly in the toothed rubber layer 12. That is, the modified nylon microfibers 22 are oriented along the length direction of the toothed belt at the regions near the surfaces of the teeth 14 and bottoms 15 of the toothed rubber layer 12. Further, at the center regions of the teeth 14, the modified nylon microfibers 22 are oriented to be perpendicular to the surface of the back rubber layer 16. Thus, the modified nylon microfibers 22 are oriented in a perpendicular direction to the base line formed by the contours of the teeth 14 and bottoms 15 of the toothed rubber layer 12.

The teeth 14 are at positions where the greatest load acts during the use of the toothed belt 10. By intermixture of the modified nylon microfibers 22 oriented in one direction, the rigidity of the teeth 14 can be strengthened and the running life of the toothed belt 10 can be extended.

Figure 2:
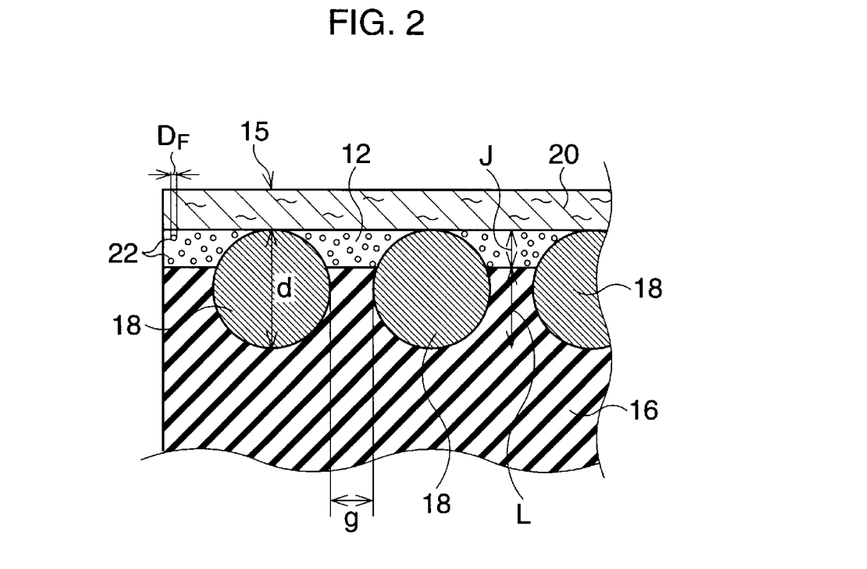
FIG. 2 is a partial sectional view showing an enlarged lateral sectional view of a bottom of the toothed belt shown in FIG. 1.

FIG. 2 shows an enlarged cross-section of a bottom 15 shown in FIG. 1. As shown in the figure, at the bottom 15, the cords 18 are in contact with the fabric 20, but in actuality there is a thin rubber layer forming part of the toothed rubber layer 12 interposed between the cords 18 and the fabric 20. As described above, the cords 18 are embedded at the interface between the toothed rubber layer 12 and the back rubber layer 16. Part of the cords 18 are embedded at the toothed rubber layer side including the modified nylon microfibers 22, while another part of the cords 18 are embedded at the back rubber layer 16 side.

In the embodiment, the embedded depth J of the cords at the toothed rubber layer 12 side is made substantially ⅓ of the diameter d, while the embedded depth L of the cords 18 with respect to the back rubber layer 16 side is made substantially ⅔ of the diameter d. Namely, part of the toothed rubber layer 12, or the rubber where the modified nylon microfibers 22 are intermixed, is made to partially penetrate between the adjoining cords 18.

As shown in FIG. 2, the plurality of cords 18 are arrayed at predetermined intervals g. This interval g is suitably changed in accordance with the material of the cords 18. For example, when the cords 18 are formed from high strength glass fibers, the interval g of the plurality of cords 18 is made one of a range of about 0.17 to about 0.28 mm. Further, when the cords 18 are formed from aramid fibers, the interval g of the plurality of cords 18 is made one of a range of about 0.25 to about 0.36 mm.

For convenience in explanation, in the following description, when the modified nylon microfibers 22 in the toothed rubber layer 12 are oriented along the length direction of the toothed belt 10, reference will be made to this as "orientation in the belt length direction".

The modified nylon microfibers 22 are comprised of a copolymer of polyolefin graft polymerized with nylon fibers. Fine denier Nylon 6 is preferably used as the nylon fibers, but it is also possible to use Nylon 6,6 or Nylon 6,10 etc. Further, polyethylene is preferably used as the polyolefin, but the invention is not limited to polyethylene. Polypropylene etc. may also be used.

The amount of the nylon fiber intermixed into the toothed rubber layer 12 is made a ratio of about 10 to about 40 part (phr) with respect to 100 parts of the stock rubber (phr: parts per hundred parts rubber). Preferably, it is made a ratio of about 25 parts (phr). Further, the amount of intermixture of polyolefin in the toothed rubber layer 12 is made a ratio of about 3 to about 40 parts (phr) with respect to 100 parts of stock rubber, preferably a ratio of about 8 parts (phr).

The fiber length $L_F$ of the modified nylon microfiber 22 is made not more than about 4000 μm, the fiber diameter $D_F$ is made not more than about 1.5 μm, and the value of the ratio ($L_F/D_F$) of the fiber length $L_F$ to the fiber diameter $D_F$ is made not less than 10, preferably, the fiber length $L_F$ is made not more than about 1000 μm, the fiber diameter $D_F$ is made not more than about 1.0 μm, and the value of the ratio ($L_F/D_F$) is made one of a range of 500 to 1500. If the fiber diameter $D_F$ and the fiber length $L_F$ are large, they become causes of cracks. Further, the cracks grow in a short time, so the belt running life falls.

As the stock rubber, a hydrogenated nitrile rubber superior in heat resistance is used. Hydrogenated nitrile rubber and the copolymer of modified nylon microfibers 22 chemically bond, whereby cracks no longer easily occur in the toothed rubber layer 12 and the back rubber layer 16 and even if occurring, do not propagate. The vulcanization of the hydrogenated nitrile rubber is not particularly limited, but vulcanization by an organic peroxide is preferable since it improves bonding between the hydrogenated nitrile rubber and modified nylon microfiber 22.

In general, when vulcanizing a hydrogenated nitrile rubber with fine denier fibers intermixed, it is known that the elasticity is lost and the hardness is increased. On the other hand, when vulcanizing a hydrogenated nitrile rubber with carbon black added, it is known that the elasticity increases. Therefore, when trying to obtain a desired elasticity or hardness when intermixing a predetermined amount of modified nylon microfibers 22 in the toothed rubber layer 12, it is sufficient to adjust the amount of the carbon black added. Note that the internal heat buildup when the toothed belt 10 is running is closely related to the modulus of elasticity of the toothed rubber layer 12, so carbon black can function as an adjusting agent for suppressing internal heat buildup while the toothed belt 10 is running.

Such modified nylon microfibers 22 are excellent in bonding with the hydrogenated nitrile rubber of the toothed rubber layer 12 compared with conventional aramid staple fibers. No slippage occurs at the interface between the modified nylon microfibers 22 and the hydrogenated nitrile rubber. Therefore, by intermixing modified nylon microfibers 22 in the toothed rubber layer 12, the rigidity of the toothed rubber layer 12 is strengthened.

Figure 7:
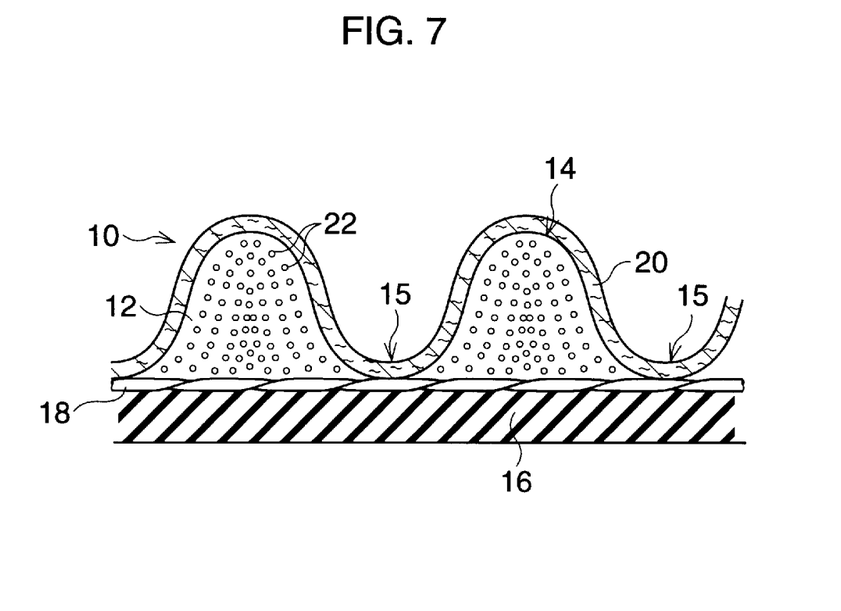
FIG. 7 is a partial side view of a second embodiment of the toothed belt.

In the first and second embodiments, the fabric 20 is formed from a woven fabric of a twill weave of a composite yarn having elasticity along the length direction of the toothed belt 10 and a non-elastic yarn along the width direction of the toothed belt 10. The fabric 20 is given elasticity along the length direction of the toothed belt 10. Note that the fabric 20 may be formed from another woven fabric, for example, a woven fabric obtained by sateen weave, flat weave, or other various modified weaves.

The composite yarn of the fabric 20 is comprised of for example a core yarn, a spun yarn wrapped around the core yarn, and a crimping yarn wrapped in the opposite direction as the winding of the spun yarn around that yarn. It is possible to use a polyurethane-based elastic yarn as the core yarn, aramid fibers superior in heat resistance as the spun yarn, and aliphatic synthetic fibers, that is, nylon fibers, superior in abrasion resistance as the crimping yarn. On the other hand, the non-elastic yarn of the fabric 20 is preferably superior in rigidity and heat resistance. For example, filament yarn of nylon fibers etc. are suitable.

An explanation will be given of the process of production of the toothed belt 10 referring to FIG. 3 to FIG. 6.

Figure 3:
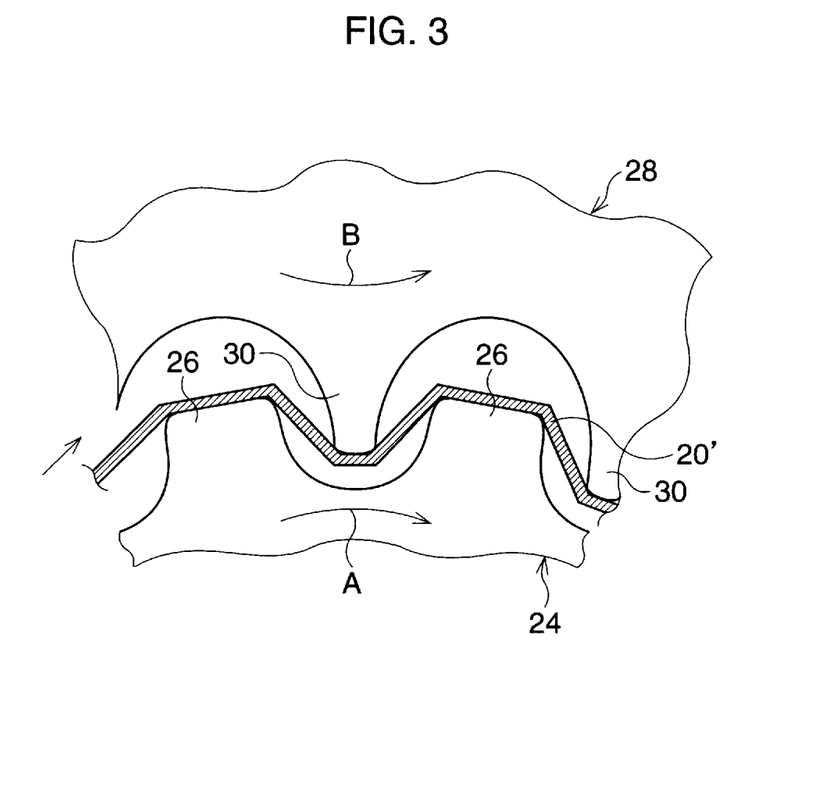
FIG. 3 is a schematic process diagram of a step pre-shaping a fabric material in the process of production of the toothed belt.

First, as shown in FIG. 3, a pre-shaping toothed drum 24 is prepared, around which teeth 26 are formed. A toothed roller 28 is engaged with the pre-shaping toothed drum 24. Bottoms 30 meshing with the teeth 26 of the pre-shaping toothed drum 24 are provided at the toothed roller 28. The pre-shaping toothed drum 24 and the toothed roller 28 are rotated in the direction shown by arrows A and B.

The fabric material 20' is fed to the pre-shaping drum 24 so as to wrap around part of the circumference of the pre-shaping drum 24 and is introduced to the engagement region with the toothed roller 28. Thus, the fabric material 20' is preformed into a corrugated shape by the meshing action of the two teeth 26 and 30. The fabric material 20' has the same woven fabric structure as the above-mentioned fabric 20 and finally becomes the fabric 20 of the toothed belt 10. The fabric material 20' is fed to the pre-shaping toothed drum 24 so that the elastic composite yarn becomes perpendicular to the axis of rotation of the pre-shaping toothed drum 24.

Figure 4:
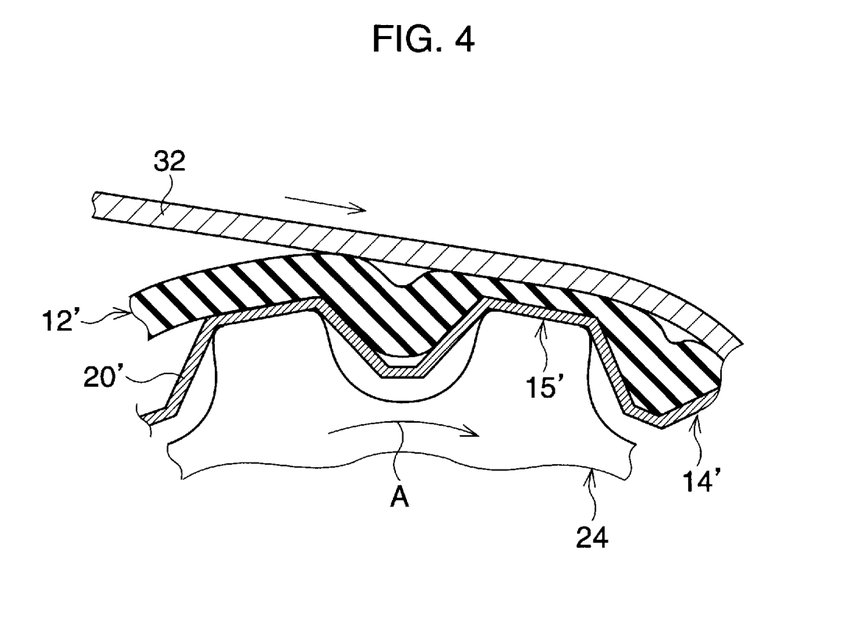
FIG. 4 is a schematic process diagram of a step of pre-shaping a toothed rubber sheet in the process of production of the toothed belt.

As shown in FIG. 4, a steel belt 32 is applied to part of the circumference of the pre-shaping toothed drum 24 by a suitable pressing force and then made to run at the same speed as the peripheral speed of the pre-shaping toothed drum 24. The blended rubber sheet 12' is fed between the pre-shaping toothed drum 24 and the steel belt 32. Due to this, the preformed fabric material 20' and the blended rubber sheet 12' are joined integrally. Namely, the blended rubber sheet 12' is pressed by the steel belt 32 and preformed in accordance with the shape of the preformed fabric material 20'. In short, an intermediate product comprised of the preformed fabric material 20' and the blended rubber sheet 12' preformed in accordance with the preforming operation is obtained.

Teeth 14' and bottoms 15' are alternately formed at the preformed blended rubber sheet 12'. These teeth 14' and bottoms 15' become the toothed rubber layer 12 comprised of the teeth 14 and the bottoms 15 of the finished toothed belt 10. A large number of nylon microfibers are intermixed and distributed in the blended rubber sheet 12' before preshaping, and are oriented in substantially one direction as a whole.

When the blended rubber sheet 12' is introduced to the pre-shaping toothed drum 24, the modified nylon microfibers in the blended rubber sheet 12' form angles of about 90 degrees with respect to the axis of rotation of the pre-shaping toothed drum 24. The toothed belt 10 shown in FIGS. 1 and 2, that is, the toothed belt 10 with the modified nylon microfibers oriented in the belt length direction, is produced from the intermediate product obtained in this way.

Figure 5:
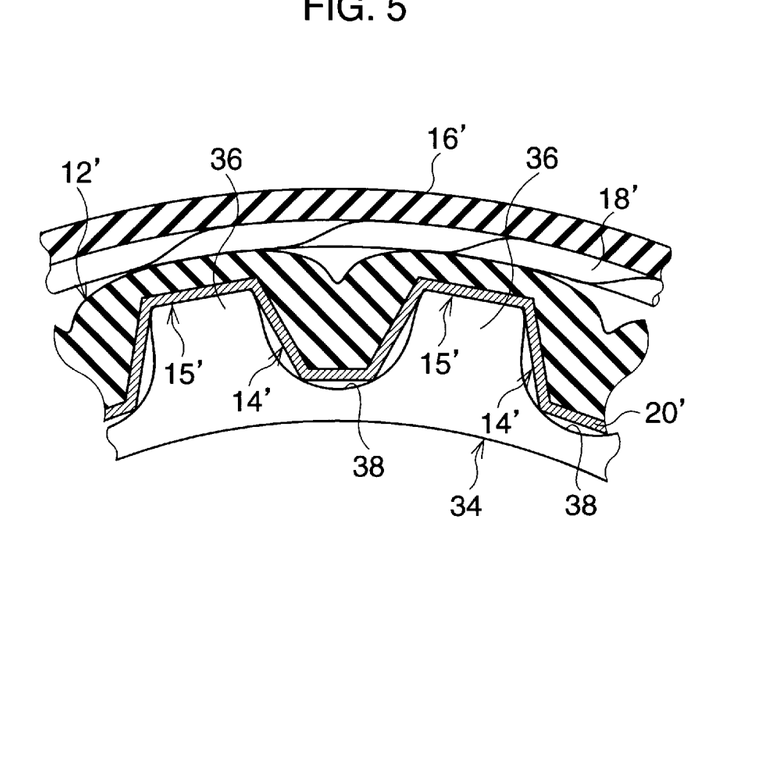
FIG. 5 is a schematic process diagram of a step of wrapping cords and a step of wrapping a back rubber sheet in the process of production of the toothed belt.

The above intermediate product is successively cut to predetermined lengths, then the cut intermediate products are wrapped around the toothed belt shaping drum 34 as shown in FIG. 5. At this time, the cut edges are made to abut against each other. Teeth 36 and bottoms 38 are alternately formed at the toothed belt shaping drum 34. The contours of the teeth 36 match with the contours of the bottoms 15 of the finished toothed belt 10. Further, the contours of the bottoms 38 match with the contours of the teeth 14 of the finished toothed belt 10.

Then, a pair of cords 18' are spirally wrapped around the cut intermediate products wrapped around the toothed belt shaping drum 34 as shown in FIG. 5. The pair of cords 18' are wrapped in a spiral along the length direction. One is made an S-twist cord, while the other cord is made a Z-twist cord. Note that the pair of cords 18' form the plurality of cords 18 in the final finished toothed belt 10.

The pair of cords 18' are arranged to give predetermined intervals. The intervals can be suitably changed in accordance with the cords 18'. For example, when the cords 18' are formed from high strength glass fibers, the cords 18' are wrapped to give intervals of about 0.17 to about 0.28 mm. Conversely, when the cords 18' are formed from aramid fibers, the cords 18' are wrapped to give intervals of about 0.25 to 0.36 mm.

After wrapping the pair of cords 18', the blended rubber sheet 16' is further wrapped over the cords 18'. The blended rubber sheet 16' becomes the back rubber layer 16 of the finished toothed belt 10.

Then, the toothed belt shaping drum 34 having the belt components 12', 16', 18', and 20' is inserted into a not shown vulcanization oven. Then, the assembly is vulcanized under a predetermined temperature and pressure. As shown in FIG. 5, there are a large number of gaps between the belt components 12', 16', 18', and 20'. These gaps are eliminated by the vulcanization.

Figure 6:
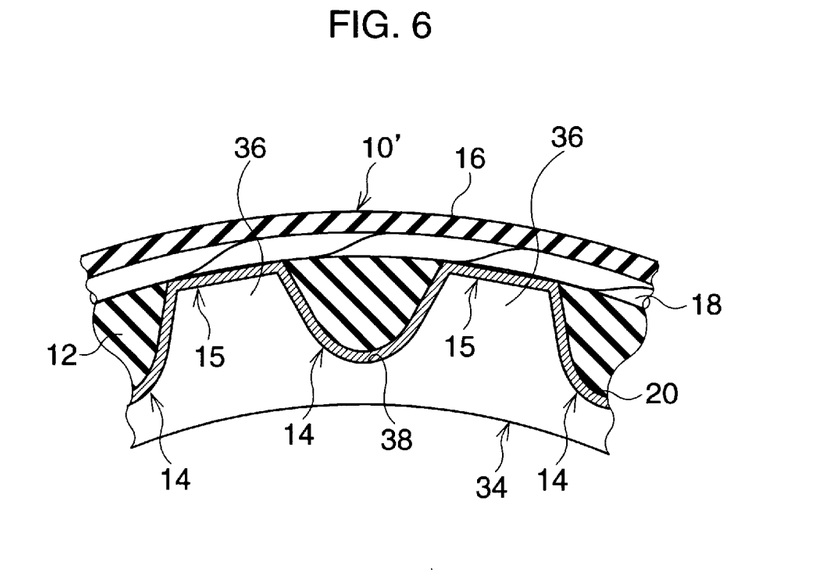
FIG. 6 is a schematic process diagram of a vulcanization step in the process of production of the toothed belt.

After the vulcanization, as shown in FIG. 6, a toothed belt slab 10' of a cylindrical shape is vulcanized and formed around the toothed belt shaping drum 34. Then, the toothed belt shaping drum 34 is taken out from the vulcanization oven and the toothed belt slab 10' is pulled off from there.

The toothed belt slab 10' is polished by a grinder etc., then cut into rings of suitable widths to obtain toothed belts 10 of the desired belt width. Note that in FIG. 6, components of the toothed belt slab 10' are given reference numerals the same as the components of the finished toothed belt 10.

As clear from the above description, in the finished toothed belt 10, the elastic composite yarn of the fabric 20 extends along the length direction of the toothed belt 10. Further, the non-elastic yarn of the fabric 20 extends along the width direction of the toothed belt 10.

In other words, according to the process of production of the toothed belt 10 shown in FIG. 3 to FIG. 6, elasticity is given to the fabric material 20' only along the circumferential direction of the pre-shaping toothed drum 24, so there is no need to give more than the necessary elasticity to the fabric material 20'. For example, a low elasticity is given to the fabric material 20' so that the fabric is elongated and the elongation at break becomes 30 to 80% of the original length. Note that in the related art, the fabric material is wrapped around the toothed belt shaping drum 34 without pre-shaping, so a large elasticity becomes necessary in the fabric material.

Further, the cords 18' are wrapped between the blended rubber sheet 12' and the blended rubber sheet 16', so part of the toothed rubber layer 12 and the back rubber layer 16 can easily enter the gaps g (FIG. 2) of the adjoining cords 18 in the finished toothed belt 10. Therefore, the bondability between the cords 18 and the toothed rubber layer 12 and the back rubber layer 16 is good and the durability of the toothed belt 10 can be improved.

Conventionally, a non-preformed fabric material was wrapped around the toothed belt shaping drum, the cords were wrapped over this, the blended rubber sheet for forming the toothed rubber layer and the back rubber layer are wrapped over this, then the assembly is vulcanized. Part of the blended rubber sheet enters from the gaps between the cords to the fabric side at the time of vulcanization to form the toothed rubber layer.

When using this conventional process of production, if nylon microfibers are intermixed in the blended rubber sheet, the blended rubber sheet does not easily enter from the spaces between the cords to the fabric side and the bottoms are liable to be formed incompletely in the finished toothed belt. Conversely, in the embodiment, since the blended rubber sheet 12' containing the nylon microfibers for forming the toothed rubber layer 12 is preformed together with the fabric material 20', so good formability of the teeth 14 is obtained.

FIG. 7 shows a second embodiment of a toothed belt according to the present invention. In the figure, components corresponding to the components of the toothed belt shown in FIG. 1 are shown using the same reference numerals.

The second embodiment is substantially the same as the first embodiment except that in the second embodiment, the modified nylon microfibers 22 in the toothed rubber layer 12 are oriented in a direction different from the first embodiment. In short, in the second embodiment, the modified nylon microfibers 22 are oriented along the width direction of the toothed belt 10. Therefore, the orientation of the modified nylon microfibers 22 is parallel to the base line forming the contours of the teeth 14 and bottoms 15 of the toothed rubber layer 12.

As shown in the second embodiment, when the orientation of the modified nylon microfibers 22 in the toothed rubber layer 12 is along the width direction of the toothed belt 10, this will be referred to as "orientation in the belt width direction" in the following description.

Note that the process of production of the toothed belt 10 shown in the second embodiment is similar to the case of the first embodiment and differs in only the point that when the blended rubber sheet 12' is introduced into the pre-shaping toothed drum 24, the modified nylon microfibers 22' in the blended rubber sheet 12' become substantially parallel with the axis of rotation of the pre-shaping toothed drum 24. Due to this, the toothed belt 10 shown in FIG. 7, or the toothed belt 10 with the modified nylon microfibers oriented in the belt width direction orientation, is produced.

In the toothed belt of the second embodiment as well, modified nylon microfibers 22 are intermixed in the toothed rubber layer 12 oriented in one direction and the modified nylon microfibers 22 are bonded with the rubber ingredient of the toothed rubber layer 12. Due to this, the rigidity of the toothed rubber layer 12 is strengthened and the running life of the toothed belt 10 can be extended.

Note that in the above embodiments, the teeth were formed only at one surface of the toothed belt, but the present invention can also be applied to two-sided toothed belts formed with teeth at the two surfaces.

EXAMPLES

Below, the present invention will be explained with reference to examples of the invention as well as comparative examples. Note that the present invention is not limited in any way by these examples.

Formulation of Blended Rubber and Method of Preparation of Samples

Four types of blended rubbers A to D to be used for the production of toothed belts were prepared as shown in the following Table 1.

TABLE 1

| Rubber material of belt | Rubber A | Rubber B | Rubber C | Rubber D |
|---|---|---|---|---|
| Stock rubber | | | | |
| Hydrogenation rate *1 | 96 | 96 | 96 | 96 |
| Iodine value *2 | 11 | 11 | 11 | 11 |
| Mooney viscosity | 120 up | 120 up | 120 up | 120 up |
| Formulation of rubber *3 | | | | |
| Rubber | 100 | 100 | 100 | 100 |
| Carbon black | 20 | 20 | 20 | 20 |
| Isononyl trimellitate | 10 | 10 | 10 | 10 |
| Stearic acid | 1 | 1 | 1 | 1 |
| Substituted diphenylamine *4 | 1.5 | 1.5 | 1.5 | 1.5 |
| Zinc methacrylate | 25 | 25 | 25 | 25 |
| Peroxide based vulcanizing agent *5 | 18 | 18 | 18 | 18 |
| TMP *6 | 6 | 6 | 6 | 6 |

TABLE 1-continued

| Rubber material of belt | Rubber A | Rubber B | Rubber C | Rubber D |
|---|---|---|---|---|
| Zinc oxide | 10 | 10 | 10 | 10 |
| 6 Nylon | *** | 25 | 20 | *** |
| Polyethylene | *** | 8.3 | 6.7 | *** |
| Meta-aramid | *** | *** | *** | 6.5 |
| Total | 191.5 | 224.8 | 218.2 | 198.0 |

In Table 1, *1 to *6 indicate the following:
*1 hydrogenation rate expressed in percentage (%).
*2 unnamed number for iodine value,
*3 type of blended materials and parts by weight of materials blended in 100 parts by weight of stock rubber,
*4 4,4'-(α,α-dimethylbenzyl) diphenylamine (obtainable as NAUGARD 445 from Uniroyal Chemical);
*5 peroxide-based vulcanizing agent comprised of dicumylperoxide and 1,3-bis (t-butylperoxyisopropyl) benzene (the former obtainable as Diecup 40C from Hercules Co. the latter obtainable as Peroxymon F40 from NOC), and
*6 abbreviation for trimethylol propane trimethacrylate,
*** No content.

As clear from Table 1, the blended rubber A was comprised of 20 parts by weight of carbon black, 10 parts by weight of isononyl trimellitate, 1.0 part by weight of stearic acid, 1.5 parts by weight of NAUGARD 445, 25 parts by weight of zinc methacrylate, 10 parts by weight of zinc white, 18 parts by weight of a peroxide-based vulcanizing agent (Diecup 40C+Peroxymon F40), and 6 parts by weight of TMP with respect to 100 parts by weight of hydrogenated nitrile rubber having a hydrogenation rate of 96%, an iodine value of 11, and a Mooney viscosity of at least 120 as the stock rubber.

A blended rubber sheet (A) was obtained from this blended rubber A by extrusion. Next, low elongation modulus test samples and compressive stress test samples were prepared from the blended rubber sheet (A), then the samples were vulcanized.

The blended rubber B was comprised of the blended rubber A plus 25 parts by weight of Nylon 6 and 8.3 parts by weight of polyethylene. Described in further detail, this was obtained by mixing 25 parts by weight of Nylon 6 and 8.3 parts by weight of polyethylene in 41.7 parts by weight of hydrogenated nitrile rubber and stirring in a temperature environment of at least the melting point of polyethylene to cause the polyethylene to graft polymerize with the Nylon 6. In this way, 75 parts by weight of hydrogenated nitrile rubber in which a graft polymer of polyethylene and Nylon 6 was mixed were obtained.

Further, the above 75 parts by weight of hydrogenated nitrile rubber containing the graph polymer, 20 parts by weight of carbon black, 10 parts by weight of isononyl trimellitate, 1.0 part by weight of stearic acid, 1.5 parts by weight of NAUGARD 445, 25 parts by weight of zinc methacrylate, 10 parts by weight of zinc white, 18 parts by weight of a peroxide-based vulcanizing agent (Diecup 40C+ Peroxymon F40), and 6 parts by weight of TMP were added to 58.3 parts by weight of hydrogenated nitrile rubber and kneaded together.

When all of the ingredients of the blended rubber B were kneaded together, the graph copolymer was finely cut and distributed in the blended rubber B as modified nylon microfibers having a fiber length $L_F$ of not more than about 1000 μm and a fiber diameter $D_F$ of not more than about 1.0 μm. The blended rubber sheet (B) was obtained by extrusion from the blended rubber B. At this time, the modified nylon microfibers mixed in the blended rubber B were oriented in the extrusion direction.

Then, low elongation modulus test samples and compressive stress test samples were prepared from the blended rubber sheet (B), then these samples were vulcanized. In the case of the blended rubber sheet (B), two types of the low elongation modulus test samples were prepared. In one type of samples, the modified nylon microfibers were oriented in parallel with the direction of tension. In the other type of samples, the modified nylon microfibers were oriented in the direction perpendicular to the direction of tension.

Two types of compressive stress test samples of the blended rubber sheet (B) were prepared. In one type of samples, the modified nylon microfibers were oriented in parallel to the direction of compression. In the other type of samples, the modified nylon microfibers were oriented in the direction perpendicular to the direction of compression.

The blended rubber C was substantially the same as the blended rubber B except for the point of the difference in intermixture of Nylon 6 and polyethylene. In the blended rubber C, exactly 20 parts by weight of Nylon 6 and 6.7 parts by weight of polyethylene were intermixed. A blended rubber sheet (C) was obtained by extrusion from the blended rubber C. The modified nylon microfibers mixed in the blended rubber C were oriented in the direction of extrusion. Low elongation modulus test samples and compressive stress test samples were prepared from the blended rubber sheet (C), then the samples were vulcanized.

In the case of the blended rubber sheet (C) as well, in the same way as the blended rubber sheet (B), two types of the low elongation modulus test samples and compressive stress test samples were prepared.

The blended rubber D comprised the blended rubber A in which exactly 6.5 parts by weight of meta-aramid staple fibers of a fiber length $L_F$ of 3 mm were intermixed. A blended rubber sheet (D) was obtained by extrusion from the blended rubber D. The modified nylon microfibers mixed in the blended rubber D were oriented in the direction of extrusion. Low elongation modulus test samples and compressive stress test samples were prepared from the blended rubber sheet (D), then the samples were vulcanized.

In the case of the blended rubber sheet (D) as well, in the same way as the blended rubber sheet (B), two types of the low elongation modulus test samples and compressive stress test samples were prepared.

Evaluation of Low Elongation Modulus Test and Compressive Stress Test

Figure 8:
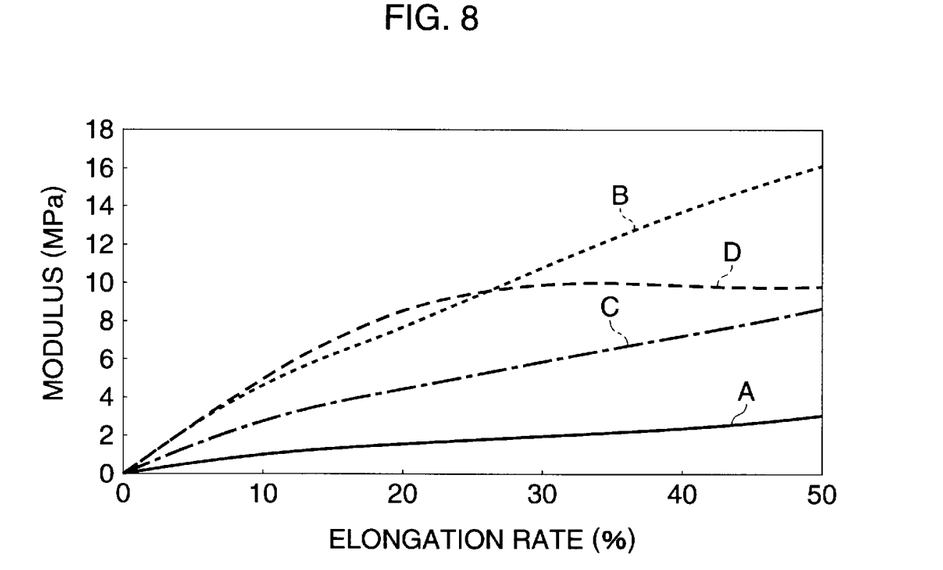
FIG. 8 is a graph of the results of a low elongation modulus test performed on four types of samples obtained from four types of vulcanized rubber sheets used in the toothed belt with the fiber direction parallel to the direction of tension.
Figure 9:
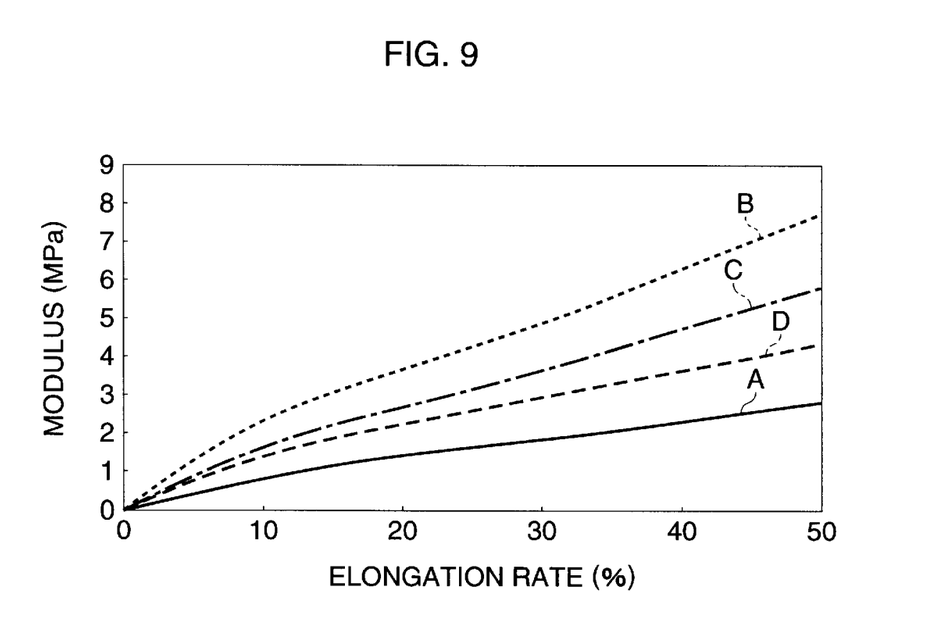
FIG. 9 is a graph of the results of a low elongation modulus test performed on four types of samples obtained from four types of vulcanized rubber sheets used in the toothed belt with the fiber direction perpendicular to the direction of tension.
Figure 10:
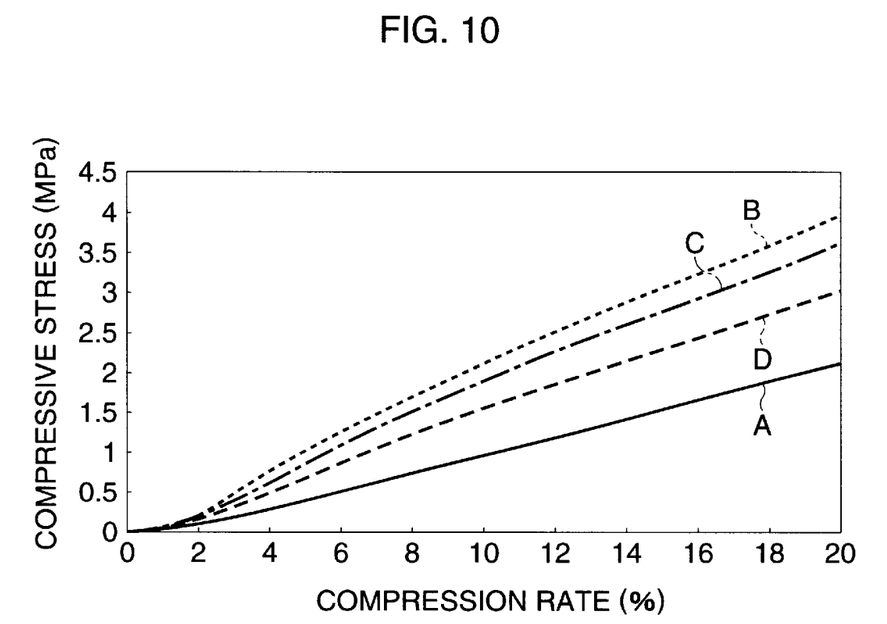
FIG. 10 is a graph of the results of a compressive stress test performed on four types of samples obtained from four types of vulcanized rubber sheets used in the toothed belt with the fiber direction parallel to the direction of compression.
Figure 11:
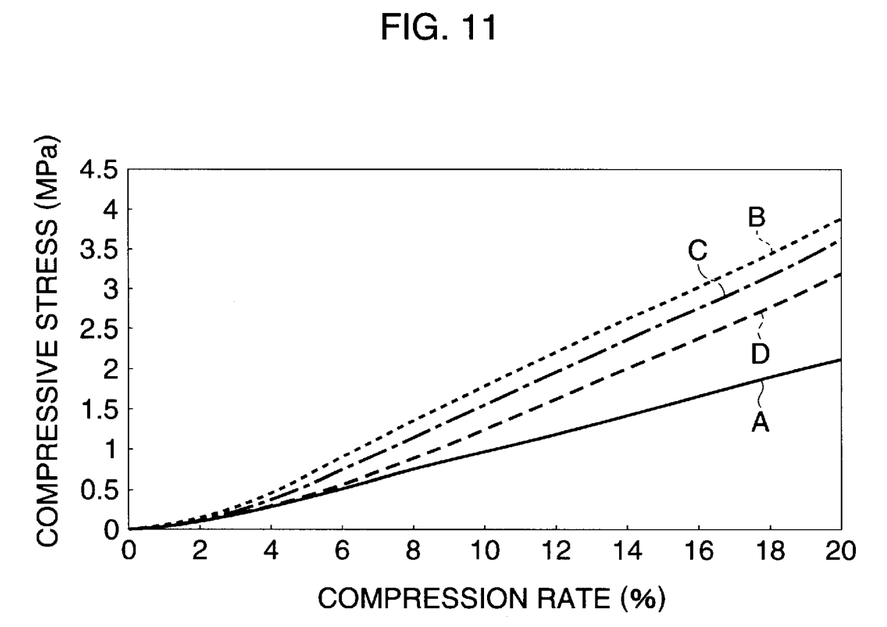
FIG. 11 is a graph of the results of a compressive stress test performed on four types of samples obtained from four types of vulcanized rubber sheets used in the toothed belt with the fiber direction perpendicular to the direction of compression.

Samples obtained from the above blended rubber sheets (A), (B), (C), and (D) were used for low elongation modulus tests and compressive stress tests. The results of the low elongation modulus test are shown in the graphs of FIGS. 8 and 9. The results of the compressive stress test are shown in FIGS. 10 and 11.

In the low elongation modulus test, tensile stress was applied to the samples at a rate of 200 mm/min. The elongations between standard lines of 20 mm of the samples were measured.

In the graph of FIG. 8, reference numeral A shows the tensile characteristics of the samples obtained from the blended rubber sheet (A). Reference numerals B, C, and D show the tensile characteristics of the samples obtained from the blended rubber sheets (B), (C), and (D) where the orientations of the modified nylon microfibers are parallel to the direction of tension.

In the graph of FIG. 9, reference numeral A shows the tensile characteristics of the samples obtained from the blended rubber sheet (A). Reference numerals B, C, and D show the tensile characteristics of the samples obtained from the blended rubber sheets (B), (C), and (D) where the orientations of the modified nylon microfibers are perpendicular to the direction of tension.

As clear from the graphs of FIGS. 8 and 9, compared with the samples obtained from blended rubber A, or the samples not containing modified nylon microfibers, the samples obtained from blended rubbers B and C, or the samples containing modified nylon microfibers and samples obtained from the blended rubber D, or samples containing meta-aramid staple fibers, exhibited higher moduli. The elongation rates of these samples were also small.

In particular, from the graph of FIG. 8, it is understood that in the case of the samples of the blended rubber D containing meta-aramid staple fibers, the moduli converge at a certain value along with the increase of the elongation, while in the case of the samples of the blended rubbers B and C, the moduli increase along with an increase of elongation. Further, from the graph of FIG. 9, in the case of the samples of the blended rubbers B and C containing the modified nylon microfibers oriented perpendicular to the direction of tension, the moduli are larger than the samples of the blended rubber D containing the meta-aramid staple fibers.

In the compressive stress test, the samples had cylindrical shapes of lengths of 25.4 mm. Pressing force was applied between the two ends to compress the samples and the lengths at the time of compression were measured.

In the graph of FIG. 10, reference numeral A shows the compression characteristics of the samples obtained from the blended rubber sheet (A). Reference numerals B, C, and D show the compression characteristics of the samples obtained from the blended rubber sheets (B), (C), and (D) where the orientations of the modified nylon microfibers are parallel to the direction of tension.

Further, in FIG. 11, reference numeral A shows the compression characteristics of the sample obtained from the blended rubber sheet (A). Reference numerals B, C, and D show the compression characteristics of the samples obtained from the blended rubber sheets (B), (C), and (D) where the orientations of the modified nylon microfibers are perpendicular to the direction of tension.

As clear from the graphs of FIGS. 10 and 11, compared with the samples obtained from the blended rubber A, or the samples not containing modified nylon microfibers, the samples obtained from the blended rubbers B and C, or the samples containing modified nylon microfibers and samples obtained from the blended rubber D, or samples containing meta-aramid staple fibers, exhibited higher compressive stress values. The compression rates of the samples were also small. In particular, the samples of the blended rubbers B and C in which the modified nylon microfibers were blended, in both the cases of parallel and perpendicular directions of orientation, exhibited higher compressive stresses compared with the samples of the blended rubber D containing the meta-aramid staple fibers.

From the results of the low elongation modulus test and compressive stress test, the blended rubbers B and C obtained by blending in the modified nylon microfibers had higher moduli and compressive stresses than the blended rubbers A and D where modified nylon microfibers were not blended and were suitable as the blended rubber of the toothed rubber layer to which a high load is applied.

Example Belts and Comparative Belts

Using the above four types of blended rubber sheets (A), (B), (C), and (D), three types of toothed belts were produced as examples of the present invention. The three types of toothed belts will be referred to below as Example Belts 1, 2, and 3.

Further, using the above two types of blended rubber sheets (A) and (D), two types of toothed belts were produced as Comparative Belts. The two types of toothed belts will be referred to below as Comparative Belts 1 and 2.

The configurations of Example Belts 1 to 3 and Comparative Belts 1 and 2 are as shown in the following Table 2.

TABLE 2

|  | Exmp. Belt 1 | Exmp. Belt 2 | Exmp. Belt 3 | Exmp. Belt 4 | Comp. Belt 1 | Comp. Belt 2 |
|---|---|---|---|---|---|---|
| Belt proper |  |  |  |  |  |  |
| Blended rubber |  |  |  |  |  |  |
| Back rubber layer | A | A | A | A | A | A |
| Toothed rubber layer | B | B | C | A | D | B |
| Orientation |  |  |  |  |  |  |
| Length direction | Yes |  | Yes |  | Yes | Yes |
| Width direction |  | Yes |  |  |  |  |
| Fabric | Yes | Yes | Yes | Yes | Yes | Yes |
| Cord | Yes | Yes | Yes | Yes | Yes | Yes |
| Dist. between cords (mm) | 0.26 | 0.26 | 0.26 | 0.26 | 0.26 | 0.26 |
| Dynamic evaluation |  |  |  |  |  |  |
| 1st running test (hrs) | 329 | 265 | 280 | 28 | 129 | 329 |
| 2nd running test (hrs) | 428 | 302 | 338 | 34 | 202 | 428 |
| 3rd running test (hrs) | 132 | 84 | 64 | 4 | 38 | 132 |

Example Belt 1

As clear from Table 2, in Example Belt 1, the blended rubber (A) was used as the back rubber layer 16 and the blended rubber (B) was used as the toothed rubber layer 12. The modified nylon microfibers of the toothed rubber layer 12 were oriented in the length direction of the belt. Note that Example Belt 1 corresponds to the first embodiment shown in FIGS. 1 and 2.

Further, in Example Belt 1, as the fabric 20, use was made of a woven fabric structure as explained above. Specifically speaking, the fabric 20 was made a 2/2 twill woven fabric. The elastic composite yarn was used as the warp. The density was 150 yarns/50 mm. Urethane elastic yarn (420 d) was used as the core for the composite yarn, aramid fiber spun yarn (200 d) was wrapped around the core, and Nylon 6,6 wooly yarn (100 d) was wrapped in the reverse direction from the aramid fiber spun yarn at the outside as the crimping yarn. On the other hand, Nylon 6,6 wooly fiber (100 d) was used as the non-elastic weft of the fabric 20 and the density was made 170 yarns/50 mm.

The fabric 20 was treated in advance by a resorcinal formaldehyde latex (RFL) solution. Due to this, the bondability with respect to the toothed rubber layer 12 was improved. Note that the RFL solution was comprised of carboxylated nitrile rubber as the latex ingredient plus an ammonia solution of a chlorophenol formaldehyde condensate, that is, a 2,6-bis-4-chlorophenol derivative.

As the cords 18, use was made of a pair of a S-twist cord and a Z-twist cord. High strength glass fibers were used for the cords. Specifically, first, 7 micron diameter high strength glass fibers were immersed in a latex solution of butadiene-styrene-vinylpyridine and chlorosulfonated polyethylene latex blended in a weight ratio of 7:3, or an RFL solution, then dried to form an RFL layer on the high strength glass fibers.

Next, three strands each comprised of 200 of these high strength glass fibers bundled together were given down twists together to make bundled strands. Eleven of these bundled strands were given up twists opposite to the down twists to obtain a cord 18'.

The cords 18' were immersed in a rubber paste solution, then dried to form an overcoat layer. After the formation of the overcoat layer, the cords were immersed in a 25% methylethylketone solution of a cashew-modified phenol resin, then dried, whereby a cashew-modified phenol resin layer was formed on the outermost layer (see Table 2).

The thus obtained S-twist and Z-twist core cords 18' were wound spirally with each other in their longitudinal directions.

Example Belt 2

As shown in Table 2, in Example Belt 2, in the same way as Example Belt 1, use was made of the blended rubber sheet (A) as the back rubber layer 16) and use was made of blended rubber sheet (B) as the toothed rubber layer 12. Example Belt 2 was substantially the same as Example Belt 1 except for the point that the orientation of the modified nylon microfibers of the toothed rubber layer 12 was made the belt width direction. This corresponds to the second embodiment shown in FIG. 7.

Example Belt 3

As shown in Table 2, in Example Belt 3, use was made of the blended rubber sheet (A) as the back rubber layer 16 and use was made of blended rubber sheet (C) as the toothed rubber layer 12. The orientation of the modified nylon microfibers of the toothed rubber layer 12, in the same way as the Example Belt 1, was made the belt length direction. Example Belt 3 was substantially the same as Example Belt 1 except for the point of use of the blended rubber sheet (C) as the toothed rubber layer 12.

Comparative Belt 1

In Comparative Example Belt 1, the blended rubber sheet (A) was used for both of the back rubber layer 16 and the toothed rubber layer 12. The belt was substantially the same as Example Belt 1 in all other matters.

Comparative Belt 2

In Comparative Belt 2, the blended rubber sheet (A) was used as the back rubber layer 16 and the blended rubber sheet (D) was used as the toothed rubber layer 12. The orientation of the meta-aramid staple fibers of the toothed rubber layer 12 was made the belt length direction in the same way as Example Belt 1. Comparative Belt 2 is substantially the same as Example Belt 1 except for the point of use of the blended rubber sheet (D) as the toothed rubber layer 12.

Running Test of Toothed Belts and Evaluation of Belt Lifetime

Example Belts 1 to 3 and Comparative Belts 1 and 2 obtained in the above way were tested by the first, second, and third running tests.

Figure 12:
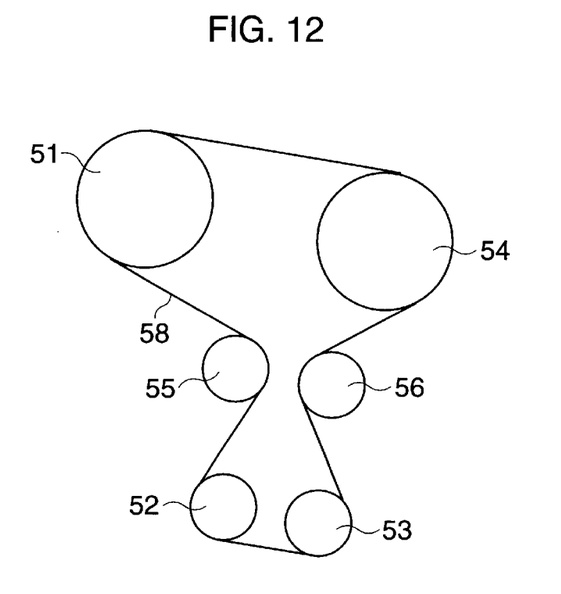
FIG. 12 is a schematic view of a first running test apparatus for performing a running test of belts of examples of the present invention and belts of comparative examples.

FIG. 12 shows the schematic configuration of a first running test apparatus. The first running test apparatus was comprised of four toothed wheels 51, 52, 53, and 54, an idler pulley 55 provided between the toothed wheels 51 and 52, and a tensioner 56 provided between the toothed wheels 53 and 54. The tested toothed belt 58 was attached to on the four toothed wheels 51, 52, 53, and 54, the idler pulley 55, and the tensioner 56 in the state shown in FIG. 14. The toothed wheel 52 was made to rotate at a speed of 2300 rpm.

In the first running test apparatus shown in FIG. 12, a plurality of toothed belts were tested under the same conditions for each of Example Belts 1 to 3 and Comparative Belts 1 and 2. For evaluation of the running test, the running times from the start of running to tooth breakage in the toothed belts were measured. For the results of the first running test, the average values of the running times of the toothed belts are shown in Table 2 and the graph of FIG. 15.

Figure 15:
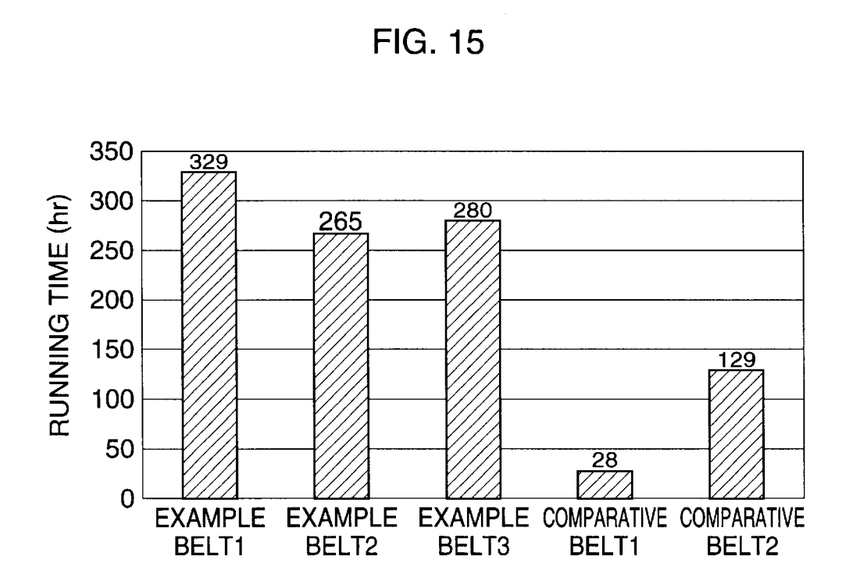
FIG. 15 is a graph of the results of a first running test of a toothed belt performed by a first running test apparatus shown in FIG. 12.

As clear from Table 2 and the graph of FIG. 15, the running time of Example Belt 1 was 329 hours, the running time of Example Belt 2 was 265 hours, and the running time of Example Belt 3 was 280 hours. As opposed to this, the running times of Comparative Belts 1 and 2 were only 28 hours and 129 hours.

Figure 13:
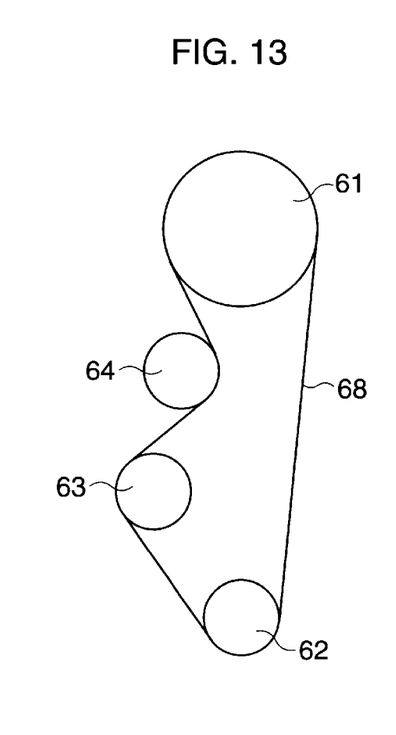
FIG. 13 is a schematic view of a second running test apparatus for performing a running test of belts of examples of the present invention and belts of comparative examples.

FIG. 13 shows the schematic configuration of a second running test apparatus. The second running test apparatus is comprised of three toothed wheels 61, 62, and 63 and a tensioner 64 provided between the toothed wheels 63 and 61. The tested toothed belt 68 was attached to the three toothed wheels 61, 62, and 63 and the tensioner 64 in the state shown in FIG. 13. The toothed wheel 62 was made to rotate at a speed of 3500 rpm.

In the second running test, like in the first running test, the toothed belts were tested under the same conditions. For evaluation, the running time from the start of running to tooth breakage in the toothed belts was measured. The results of the second running test are shown in Table 2 and the graph of FIG. 16. The running times are shown as average values.

Figure 16:
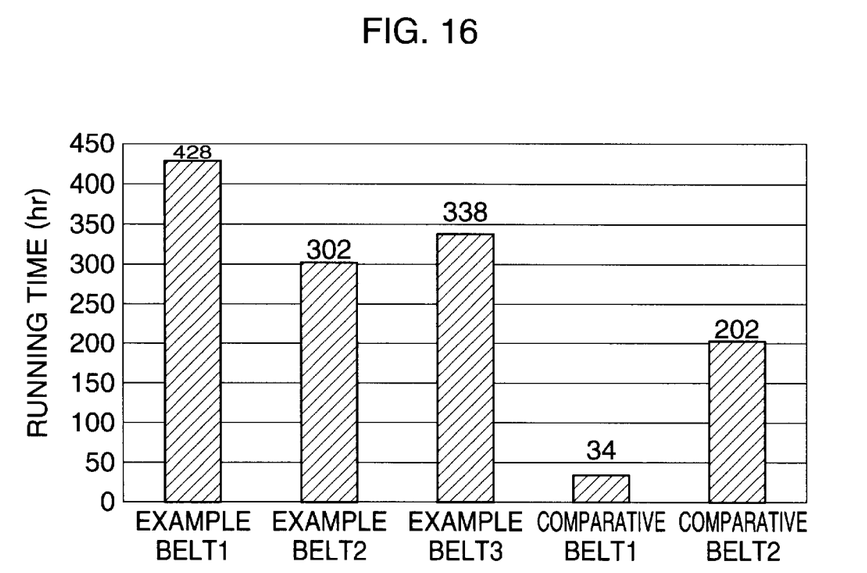
FIG. 16 is a graph of the results of a second running test of a toothed belt performed by a second running test apparatus shown in FIG. 13.

As clear from Table 2 and the graph of FIG. 16, the running time of Example Belt 1 was 428 hours, the running time of Example Belt 2 was 302 hours, and the running time of Example Belt 3 was 338 hours. As opposed to this, the running times of the Comparative Belts 1 and 2 were only 34 hours and 202 hours.

Figure 14:
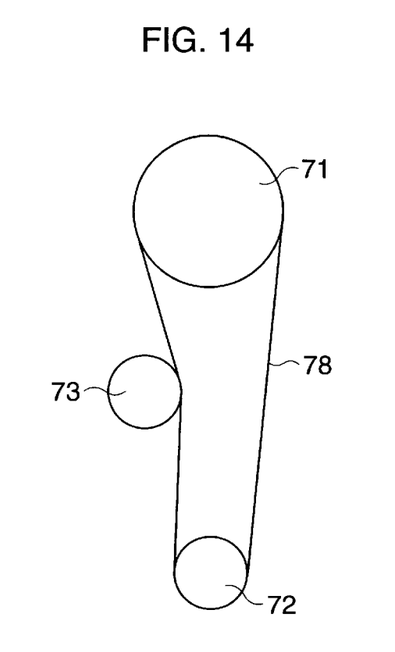
FIG. 14 is a schematic view of a third running test apparatus for performing a running test of belts of examples of the present invention and belts of comparative examples.

FIG. 14 shows the schematic configuration of the third running test apparatus. This third running test apparatus is comprised of two toothed wheels 71 and 72 and a tensioner 73 provided between the toothed wheels 72 and 71. The tested toothed belt 78 was hung around the two toothed wheels 71 and 72 and the tensioner 73 in the state shown in FIG. 14. The toothed wheel 72 was made to rotate at a speed of 5000 rpm.

In the third running test, the toothed belts were tested under the same conditions. To evaluate the running test, the running time from the start of running to tooth breakage in the toothed belts was measured. The results of the third running test are shown in Table 2 and the graph of FIG. 17. The running times are shown as average values.

Figure 17:
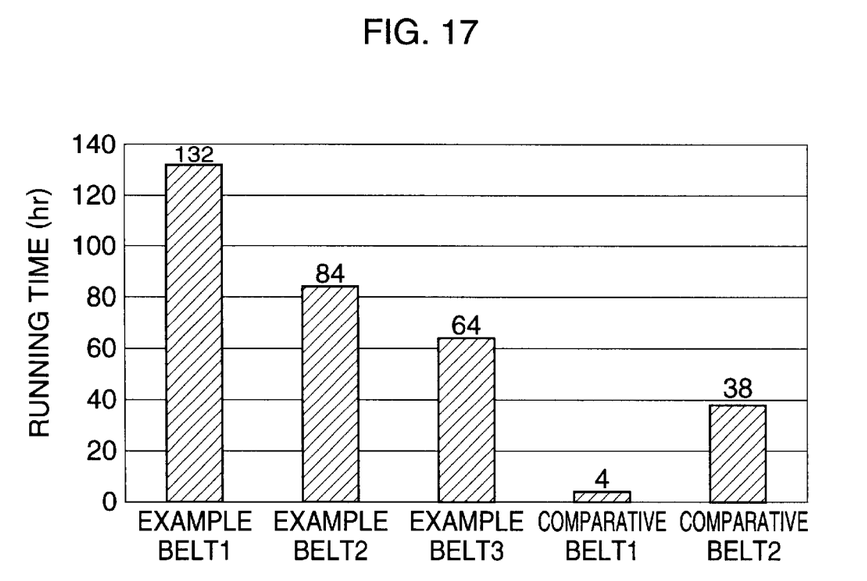
FIG. 17 is a graph of the results of a third running test of a toothed belt performed by a third running test apparatus shown in FIG. 14.

As clear from Table 2 and the graph of FIG. 17, the running time of Example Belt 1 was 132 hours, the running time of Example Belt 2 was 84 hours, and the running time of Example Belt 3 was 64 hours. As opposed to this, the running times of the Comparative Belts 1 and 2 were only 4 hours and 38 hours.

In each of the results of the above three running tests, Example Belts 1 to 3 with the modified microfibers mixed into the toothed rubber layer were clearly better in durability than Comparative Belts 1 and 2 where no modified microfibers were intermixed in the toothed rubber layer.

Although the embodiments of the present invention have been described herein with reference to the accompanying drawings, obviously many modifications and changes may be made by those skilled in this art without departing the scope of the invention.

The present disclosure relates to subject matter contained in Japanese Patent Application No. 10-346039 (filed on Dec. 4, 1998) which is expressly incorporated herein, by reference, in its entirety.

What is claimed is:

1. A toothed belt comprising:

a toothed rubber layer that has teeth and bottoms formed alternately on one surface;

a back rubber layer integrally joined to another surface of said toothed rubber layer; and a plurality of cords interposed at the interface between said toothed rubber layer and said back rubber layer, extending along the length direction of the toothed belt, and arrayed along the width direction;

a large number of modified nylon microfibers being intermixed and regularly oriented in the toothed rubber layer, the modified nylon microfibers being made of a copolymer obtained by graft polymerization of a polyolefin with fine denier nylon fibers.

2. The toothed belt as set forth in claim 1, wherein a fiber length $L_F$ of the modified nylon microfibers is not more than about 4000 μm, the fiber diameter $D_F$ of the modified nylon microfibers is not more than about 1.5 μm, and the value of the ratio of the fiber length $L_F$ to the fiber diameter $D_F$ ($L_F/D_F$) is not less than 10.

3. The toothed belt as set forth in claim 2, wherein said fiber length $L_F$ is not more than about 1000 μm, the fiber diameter $D_F$ is not more than about 1.0 μm, and the value of the ratio ($L_F/D_F$) is in the range of 500 to 1500.

4. The toothed belt as set forth in claim 1, wherein about 10 to about 40 parts by weight of nylon fibers are mixed in 100 parts by weight of rubber stock of the toothed rubber layer.

5. The toothed belt as set forth in claim 1, wherein about 25 parts by weight of nylon fibers are mixed in 100 parts by weight of rubber stock of the toothed rubber layer.

6. The toothed belt as set forth in claim 1, wherein about 3 to about 40 parts by weight of polyolefin are mixed in 100 parts by weight of the rubber stock of the toothed rubber layer.

7. The toothed belt as set forth in claim 6, wherein about 8 parts by weight of polyolefin are mixed in 100 parts by weight of the rubber stock of the toothed rubber layer.

8. The toothed belt as set forth in claim 1, wherein said nylon fiber is Nylon 6.

9. The toothed belt as set forth in claim 1, wherein said polyolefin is polyethylene.

10. The toothed belt as set forth in claim 1, wherein stock rubber used for the toothed rubber layer and the back rubber layer is a hydrogenated nitrile rubber with a hydrogenation rate of at least 91%.

11. The toothed belt as set forth in claim 10, wherein said toothed rubber layer and said back rubber layer are formed from a rubber obtained by adding a peroxide-based vulcanizing agent to said stock rubber.

12. The toothed belt as set forth in claim 1, wherein said modified nylon microfibers are oriented in the length direction of the toothed belt and in that said modified nylon microfibers are oriented along contours at regions near alternating contours of the teeth and the bottoms of said toothed belt layer and are oriented substantially perpendicular to the surface of the back rubber layer at the center regions of the teeth of the toothed rubber layer.

13. The toothed belt as set forth in claim 1, wherein said modified nylon microfibers are oriented in the width direction of the toothed belt.

14. The toothed belt as set forth in claim 1, wherein fabric is provided to cover the teeth and the bottoms of the toothed rubber belt and in that the fabric is comprised of an elastic composite yarn extending along the length direction of the toothed belt and a nonelastic yarn extending along the width direction of the toothed belt.

15. The toothed belt as set forth in claim 14, wherein said fabric is formed with a resorcinol formaldehyde latex layer.

16. The toothed belt as set forth in claim 14, wherein said fabric is preformed.

17. The toothed belt as set forth in claim 1, wherein said cords are comprised of high strength glass fibers and the cords are arrayed at intervals of about 0.17 to about 0.28 mm.

18. The toothed belt as set forth in claim 1, wherein said cords are comprised of aramid fibers and the cords are arrayed at intervals of about 0.25 to about 0.36 mm.

19. The toothed belt as set forth in claim 1, wherein said cords are treated by a resorcinol formaldehyde latex solution, an overcoat layer of a rubber paste solution is formed on the cords, and a cashew-modified phenol resin layer is formed on the overcoat layer.

* * * * *